United States Patent
Matsuo (10) Patent No.: US 7,392,132 B2
(45) Date of Patent: Jun. 24, 2008

(54) POSITION NOTIFYING DEVICE (75) Inventor: Shojiro Matsuo, Kasuya-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 470 days.

(21) Appl. No.: 10/517,634

(22) PCT Filed: Jun. 13, 2003

(86) PCT No.: PCT/JP03/07532

§ 371 (c)(1),
(2), (4) Date: Aug. 29, 2005

(87) PCT Pub. No.: WO03/107303

PCT Pub. Date: Dec. 24, 2003

(65) Prior Publication Data

US 2006/0015220 A1    Jan. 19, 2006

(30) Foreign Application Priority Data

Jun. 14, 2002    (JP) .................... 2002-173736

(51) Int. Cl.
*G08G 1/13* (2006.01)
*G01C 21/00* (2006.01)

(52) U.S. Cl. .................... 701/207; 340/992; 342/357.09

(58) Field of Classification Search .................. 340/992
See application file for complete search history.

(56) References Cited

U.S. PATENT DOCUMENTS

| | | | |
|---|---|---|---|
| 6,243,039 B1 * | 6/2001 | Elliot | 342/457 |
| 6,336,038 B1 | 1/2002 | Nojima et al. | |
| 6,377,810 B1 * | 4/2002 | Geiger et al. | 455/456.2 |
| 6,560,461 B1 * | 5/2003 | Fomukong et al. | 455/456.2 |
| 6,640,184 B1 * | 10/2003 | Rabe | 701/207 |
| 7,088,237 B2 * | 8/2006 | Arcens | 340/539.13 |
| 7,130,630 B1 * | 10/2006 | Enzmann et al. | 455/435.1 |
| 7,212,829 B1 * | 5/2007 | Lau et al. | 455/456.1 |
| 2003/0069692 A1 * | 4/2003 | Krasner et al. | 701/213 |

FOREIGN PATENT DOCUMENTS

| | | |
|---|---|---|
| EP | 1 209 933 | 5/2002 |
| JP | 11-86195 | 3/1999 |
| JP | 11-168574 | 6/1999 |
| JP | 11-183184 | 7/1999 |
| JP | 11-321587 | 11/1999 |
| JP | 2000-194993 | 7/2000 |
| JP | 2001-221651 | 8/2001 |
| JP | 2001-344695 | 12/2001 |
| JP | 2003-058987 | 2/2003 |
| JP | 2003-075159 | 3/2003 |
| WO | 02/03735 | 1/2002 |
| WO | WO 03/34765 A1 * | 4/2003 |

* cited by examiner

*Primary Examiner*—Michael J. Zanelli
(74) *Attorney, Agent, or Firm*—Wenderoth, Lind & Ponack, L.L.P.

(57) ABSTRACT

From a data terminal device (3), a position notifying device (1) acquires a position request for requesting position information of a target object and identification information, with identification information for identifying the data terminal device (3) being stored in a storage section (11). In response thereto, the position notifying device (1) determines whether the currently acquired identification information is stored in the storage section (11) or not. If the identification information is stored, the position notifying device (1) generates position information of the target object, and sends the position information to the data terminal device (3).

5 Claims, 10 Drawing Sheets

FIG. 13 ural Application No. PCT/JP2003/07532, filed on Jun.
POSITION NOTIFYING DEVICE

CLAIM OF PRIORITY

This application claims priority under 35 USC 371 to International Application No. PCT/JP2003/07532, filed on Jun. 13, 2003, which claims priority to Japanese Patent Application No. 2002-173736, filed on Jun. 14, 2002, each of which is incorporated by reference in its entirety.

TECHNICAL FIELD

The present invention relates to a position notifying device, and more particularly to a position notifying device which transmits a current position of a target object to an external data terminal device.

BACKGROUND ART

An example of a conventional position notifying device is an e-mail apparatus for vehicles disclosed in Japanese Laid-Open Patent Publication No. 11-86195. Based on a current position of a target object (which is an vehicle in the aforementioned publication) as estimated by a car navigation apparatus, thee-mail apparatus for vehicles creates an e-mail containing a message for transmission, and transmits the created e-mail to a first mail server on the Internet via a communication section.

The first mail server temporarily stores the e-mail which has been transmitted from the e-mail apparatus for vehicles, and thereafter transmits the e-mail to a second mail server which is specified by an address described in the e-mail. The e-mail having been stored in the second mail server is to be acquired by a data terminal device at a receiver's end, which has an e-mail receiving function.

However, the aforementioned e-mail apparatus for vehicles creates and transmits an e-mail containing a message for transmission at every previously-set time interval or each time the vehicle has traveled a previously-set distance. Therefore, there is a problem in that the receiver cannot know the current position of the automobile when wanting to know the automobile's position.

Therefore, an object of the present invention is to provide a position notifying device with which a receiver can easily know a current position of a remote target object.

DISCLOSURE OF THE INVENTION

In order to attain the object mentioned above, a first aspect of the present invention is directed to a position notifying device, mounted on a moving object, for transmitting position information of the moving object to a remote data terminal device, comprising: a storage section for storing identification information for identifying the data terminal device; a reception section for receiving, from the data terminal device, a position request for requesting position information of a moving object and identification information; an identification information determination section for, in response to the position request received by the reception section, determining whether the identification information received by the reception section has been stored in the storage section or not; a position information generation section for, after the identification information determination section determines that the identification information has been stored in the storage section, generating position information of the moving object; a transmission section for transmitting each piece of position information generated by the position information generation section to the data terminal device; and an end determination section for, after the transmission section has transmitted each piece of position information, determining whether or not to end provision of position information to the data terminal device. The position information generation section newly generates position information of the moving object, at a time interval, until the end determination section determines that provision of position information is to be ended.

These and other objects, features, aspects and advantages of the present invention will become more apparent from the following detailed description of the present invention when taken in conjunction with the accompanying drawings.

BEST MODE FOR CARRYING OUT THE INVENTION

Embodiment

Figure 1:
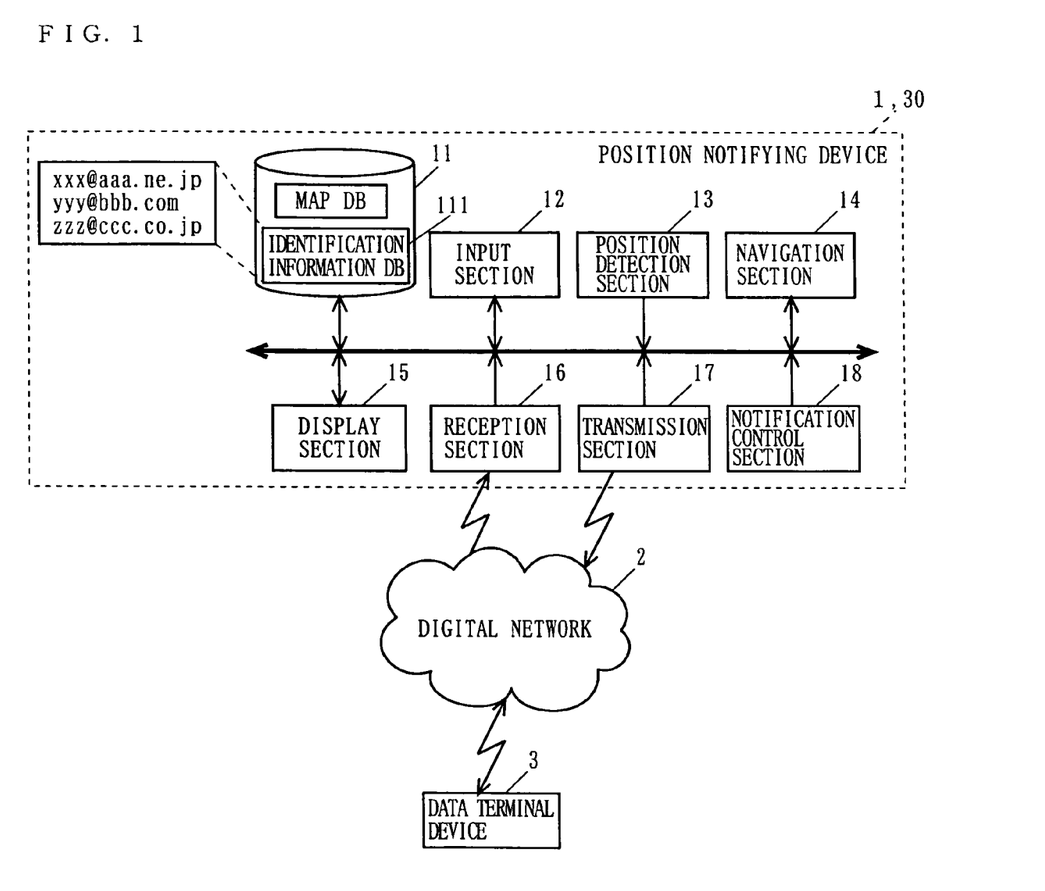
FIG. 1 is a block diagram illustrating the overall structure of a position notifying device 1 according to an embodiment of the present invention.

FIG. 1 is a block diagram illustrating the overall structure of a position notifying device 1 according to an embodiment of the present invention. In FIG. 1, the position notifying device 1 is typically incorporated in a navigation system for vehicles, and comprises a storage section 11, an input section 12, a position detection section 13, a navigation section 14, a display section 15, a reception section 16, a transmission section 17, and a notification control section 18.

The storage section 11, which is typically a non-volatile storage device such as a hard disk drive, stores a map database (hereinafter referred to as a "map DB") which is necessary for generating a map. The map DB may be a commonly-used one, and contains text data, road network data, and object data.

The text data contains a character sequence to be superposed on a map, and position information indicating where on the map to show a target character sequence. Typical examples of character sequences include intersection names, road names, river names, city/town/village names, and facility names.

The road network data expresses connections between roads on the map by using a plurality of nodes and a plurality of links. Herein, each node is assigned to characteristic points on the road, such as intersections, points of deflection, and dead ends, and at least contains information for identifying the position of a characteristic point to which the node is assigned. Each link expresses a road segment which connects two characteristic points, and at least contains information for identifying a node representing two characteristic points.

The object data represents component elements of a map, such as parks, bridges, rivers, railroads, buildings, and greenbelts.

The storage section 11 further stores a database of identification information (hereinafter referred to as "identification information DB") 111. The identification information DB 111 is a collection of identification information which uniquely identifies data terminal a device(s) 3 (see FIG. 1) which are permitted to receive position information from the present position notifying device 1. Herein, in the present embodiment, the identification information is exemplified as an e-mail address.

The input section 12 is typically: a touch panel which is provided on a screen (not shown) of the display section 15 described later, a switch which is provided at the front of the main body of a navigation system, a switch which is provided on a remote control which comes with a navigation system, or a voice input device; or a combination thereof.

The position detection section 13 typically utilizes information which is sent from a number of artificial satellites accommodated by a positioning system such as the GPS (Global Positioning System) to calculate the current position of an vehicle. In the present embodiment, calculating the current position of an vehicle by utilizing information from another positioning system will be referred to as a non-autonomous navigation technique. Furthermore, the position detection section 13 calculates a distance traveled by the vehicle by utilizing a current car velocity from an vehicle velocity sensor not shown, and further calculates the current position of the vehicle by accumulating the calculated traveled distance and a current traveling direction from a direction sensor not shown (autonomous navigation technique). The position detection section 13 makes a highly accurate estimate of the current position of an vehicle V by utilizing a current position obtained through a non-autonomous navigation technique and a current position obtained through an autonomous navigation technique in a complementary manner. Note that, as is clear from the above, the position detection section 13 adopts a so-called hybrid navigation technique. However, rather than being limited to the above, the position detection section 13 may only adopt a non-autonomous navigation technique.

The navigation section 14 performs various processes which are required of a navigation system. A typical process by the navigation section 14 is generating a map image representing the current position of the vehicle and a neighborhood map thereof by using a map DB and a current position as obtained from the position detection section 13. Another process may be, after searching for a route from a starting point to a destination point, each of which is designated by a predetermined method, generating a guidance image for guiding the vehicle along the found route to the destination point.

The display section 15, which is typically composed of a liquid crystal display and a driving circuit therefor, displays the map image and the guidance image generated by the navigation section 14. Furthermore, the display section 15 displays a registration confirmation image generated by the notification control section 18.

The reception section 16 receives an e-mail which is sent from the external digital network 2 via a wireless network, and sends it to the notification control section 18. The e-mail received by the reception section 16 is originally sent from a data terminal device 3 that requests the position notifying device 1 to provide position information, and contains a character sequence (hereinafter referred to as a "request identifier") for requesting position information of the vehicle.

The transmission section 17 sends out the e-mail generated by the notification control section 18 onto the wireless network. The e-mail generated by the notification control section 18 includes information capable of specifying the current position of the vehicle (hereinafter referred to as "position information").

The notification control section 18 performs a process necessary for providing the current position of the vehicle for the data terminal device 3. The process by the notification control section 18 will be described later.

The position notifying device 1 as such performs a data communication with a predetermined data terminal device 3 via the digital network 2. In the present embodiment, the data terminal device 3 is a device having an e-mail transmission/reception function, which may typically be a cellular phone, a navigation system, a PDA (Personal Digital Assistant), or a personal computer.

Next, the operation and the process of the position notifying device 1 will be described. First, a driver of the vehicle operates the input section 12 to input an e-mail address which is assigned to a data terminal device 3 possessed by a person who is entitled to notification of the current position of the vehicle. Hereinafter, the driver of the vehicle will be referred to as a "provider" based on the fact that the driver is to provide the current position of the vehicle, whereas the possessor of the data terminal device 3 will be referred to as a "recipient" based on the fact that the possessor is to receive the current position of the provider's vehicle. The input device 12 sends the input e-mail address to the notification control section 18. The notification control section 18 registers the received e-mail address to the identification information DB 111 in the storage section 11.

Figure 2:
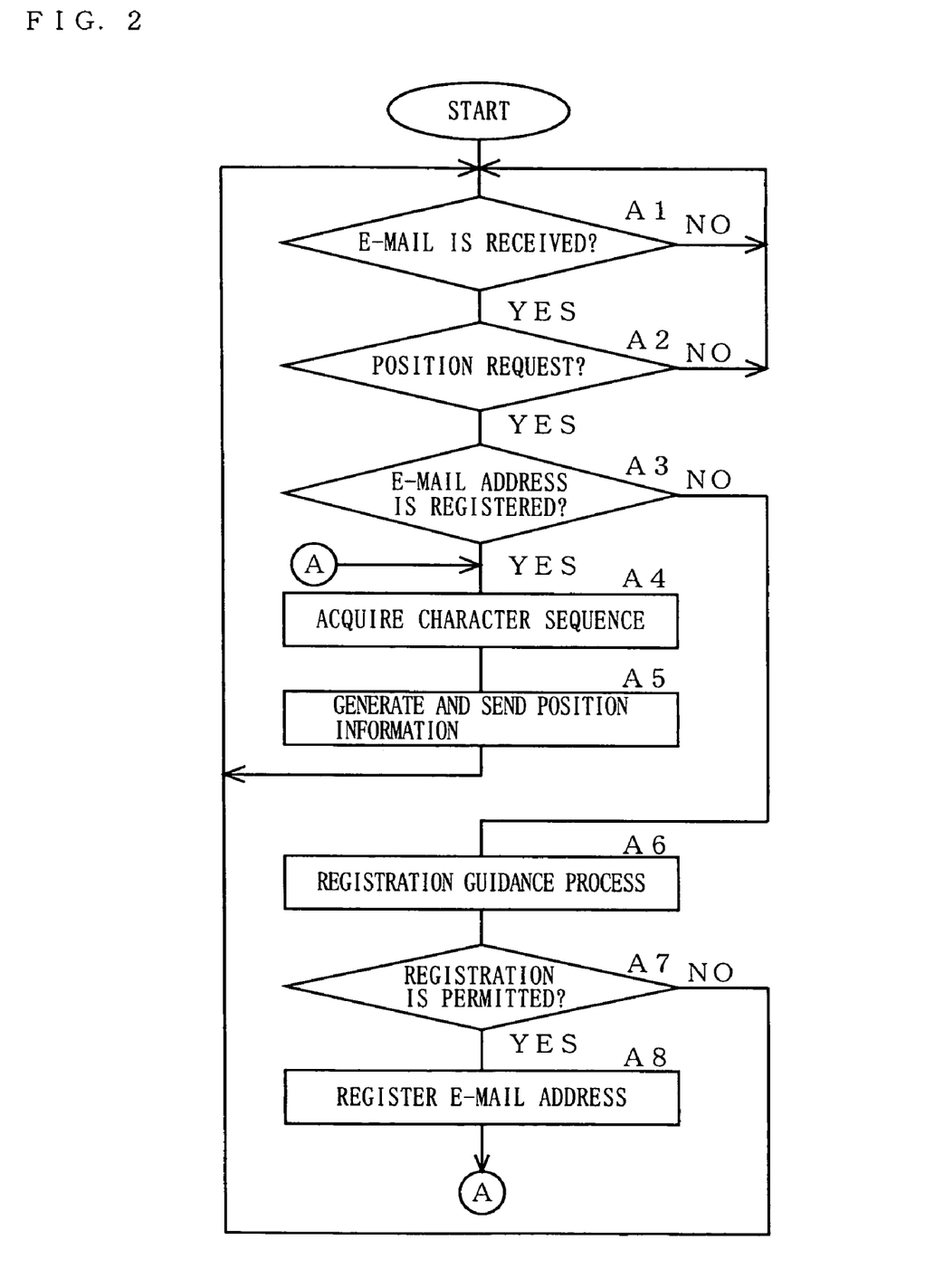
FIG. 2 is a flowchart illustrating an operation of the position notifying device 1 shown in FIG. 1.

Hereinafter, with reference to the flowchart of FIG. 2, processes which are characteristic of the position notifying device 1 will be described.

While the provider is driving the vehicle, the navigation section 14 performs processes necessary for navigation, such as those described above.

A recipient, when wanting to know the current position of the provider, operates the recipient's data terminal device 3 to create an e-mail as follows. The created e-mail is to include the aforementioned request identifier, typically in a predetermined box such as a subject box or a main text box. Furthermore, in the addressee box of the e-mail, an e-mail address which is assigned to the position notifying device 1 is to be described. Hereinafter, in the present embodiment, an e-mail which is created at the data terminal device 3 side may be referred to as a "position request". The e-mail which has been created at the data terminal device 3 is sent out from the data terminal device 3 onto the digital network 2.

In the position notifying device 1, the reception section 16 receives the e-mail from the data terminal device 3 via the digital network 2 (step A1 in FIG. 2), and sends the received e-mail to the notification control section 18. The notification control section 18 extracts a request identifier from a predetermined box of the present e-mail. Thereafter, the notification control section 18 determines whether the extracted request identifier is for requesting position information of the vehicle or not. In other words, the notification control section 18 determines whether the present e-mail is a position request or not (step A2).

If it is determined "NO" at step A2, the notification control section 18 returns to step A1, and awaits reception of a new e-mail. On the other hand, if it is determined "YES", the notification control section 18 extracts an e-mail address of the data terminal device 3 from the sender address box of the present e-mail. Thereafter, the notification control section 18 determines whether the same e-mail address as that which is currently extracted is registered in the identification information DB 111 of the storage section 11 or not (step A3).

If it is determined "YES" at step A3, the notification control section 18 requests the navigation section 14 for the aforementioned position information. In response to the request from the notification control section 18, the navigation section 14 receives the current position from the position detection section 13, and by further utilizing road network data in the map DB, matches the received current position onto a road on the map (map matching). Thus, the navigation section 14 recognizes the current position of the vehicle on the map. Thereafter, the navigation section 14 extracts a predetermined character sequence from the text data in the map DB. The character sequence to be extracted includes: the name of a city/town/village or a road in or on which the vehicle is currently traveling, or the name of an intersection or a facility which lies closest to the current position of the vehicle. The notification control section 18 receives the character sequence which has been extracted by the navigation section 14 (step A4).

Next, in order to reply to the e-mail currently sent from the data terminal device 3, the notification control section 18 creates, from the received character sequence, a main text or subject as position information typically composed of text, and sets it in the main text box or the subject box of an e-mail. An example of the text to be created at this time may be "the vehicle is currently traveling along Route N in XX city, near CC intersection". In the addressee box of this e-mail, the e-mail address of the data terminal device 3 is set. Thereafter, the notification control section 18 passes the created e-mail to the transmission section 17, and the transmission section 17 sends out the received e-mail onto the digital network 2 (step A5).

Figure 3:
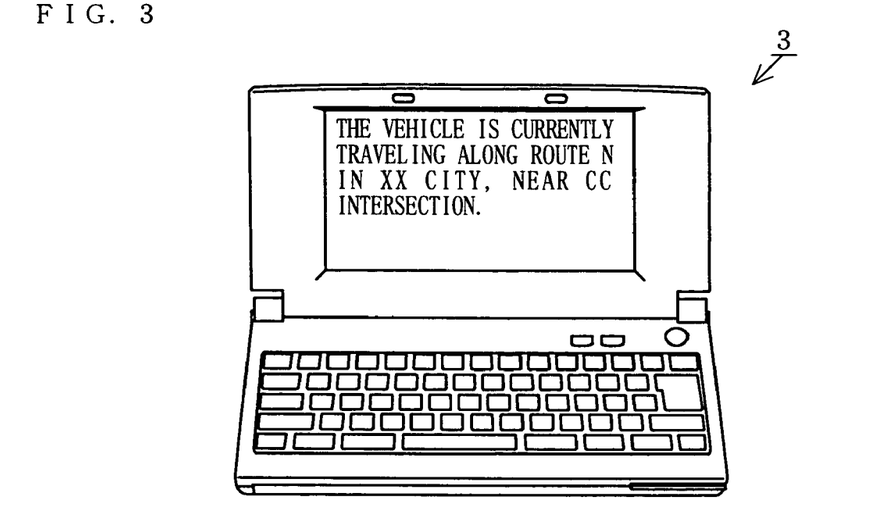
FIG. 3 is a schematic diagram illustrating an example of position information to be displayed on a data terminal device 3 of FIG. 1.

The data terminal device 3 receives the e-mail from the position notifying device 3 via the digital network 2. Thereafter, in a manner as shown in FIG. 3, the data terminal device 3 displays the position information contained in the e-mail. As a result, the recipient can know the current position of the provider.

Figure 4:
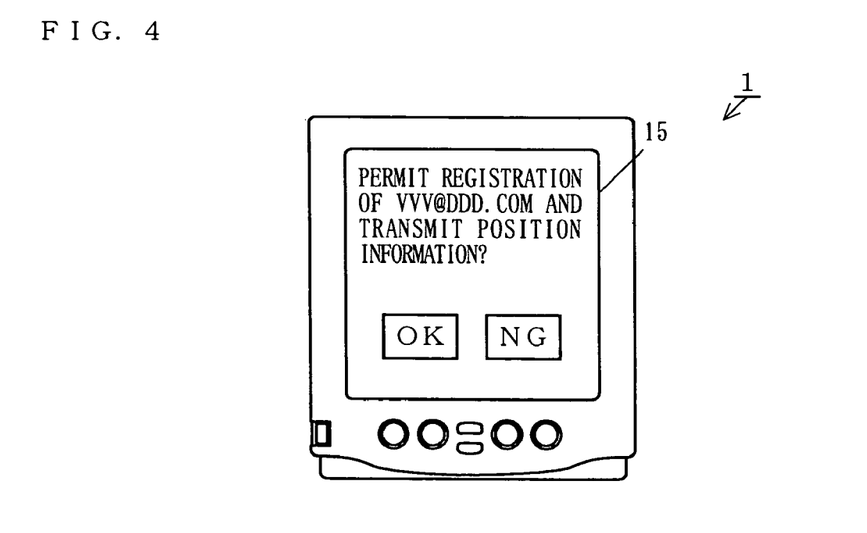
FIG. 4 is a schematic diagram illustrating an example of a registration confirmation image to be displayed on a display section 15 at step A6 in FIG. 2.

On the other hand, if it is determined "NO" at step A3, the notification control section 18 assumes that the sender of the present e-mail is not presently permitted to receive notification of the current position of the provider, and performs a registration guidance process (step A6). Specifically, the notification control section 18 generates an image (hereinafter referred to as a "registration confirmation image") for inquiring as to whether the e-mail address which has been extracted at step A3 may be registered to the identification information DB 111 or not, and passes the image to the display section 15. The display section 15 displays the received registration confirmation image in a manner as shown in FIG. 4.

Looking at the displayed registration confirmation image, the provider inputs an answer to the inquiry from the position notifying device 1, by operating the input section 12. The input section 12 passes to the notification control section 18 the answer which has been input. If the received answer indicates permission of registration of the e-mail address (step A7), the notification control section 18 registers the target e-mail address to the identification information DB 111 in the storage section 11 (step A8), and thereafter performs step A4. On the other hand, if the received answer indicates non-permission of registration (step A7), step A8 is not performed, and control returns to step A1 to await reception of a new e-mail. Note that, before returning to step A1, the notification control section 18 may create an e-mail indicating that the position information cannot be provided, e.g., an e-mail with "position information cannot be provided" being set in the main text box or the subject box, and reply to the data terminal device 3 with this.

As described above, according to the present embodiment, a recipient who wants to know the current position of a provider operates his or her own data terminal device 3 to transmit a position request to the position notifying device 1. The data terminal device 3 receives the current position of the provider from the position notifying device 1 only if the e-mail address assigned to the data terminal device 3 itself is registered in the storage section 11 or if the provider gives permission. Thus, the recipient can know the current position of the provider when the recipient wants to know. Since the position notifying device 1 provides the position information of the provider only to those data terminal devices 3 which are permitted, it is ensured that position information is not provided to those who are considered undesirable by the provider.

In the above embodiment, at step A5, the notification control section 18 generates position information composed of text, by using a character sequence which is obtained from the navigation section 14. Rather than being limited to the above, in response to a request from the notification control section 18, the navigation section 14 may generate as position information a neighborhood map image on which a mark indicating the current position of the vehicle is superposed, and, at step A5, the notification control section 18 may create an e-mail to which the neighborhood map image is attached as the position information.

Figure 5:
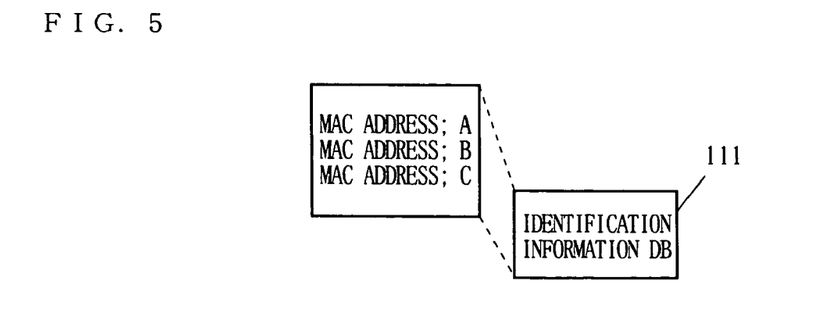
FIG. 5 is a schematic diagram illustrating an other exemplary structure of an identification information DB 111 shown in FIG. 1.

In the above embodiment, the position notifying device 1 and the data terminal device 3 perform transmission and reception of position information via e-mails. Rather than being limited to the above, the position notifying device land the data terminal device 3 may perform transmission and reception of position information in accordance with the Internet Protocol (hereinafter abbreviated as IP (Internet Protocol)), via the digital network 2. In this case, however, the identification information will be MAC (Media Access Control) addresses which are uniquely assigned to the position notifying device 1 and to the data terminal device 3. Therefore, as shown in FIG. 5, the identification information DB 111 will be a collection of MAC addresses.

Even in the case of the IP, if it is possible to assign unique IP addresses to the position notifying device 1 and to the data terminal device 3 as in the case of version 6 (IPv6), IP addresses can be used as identification information.

In the above embodiment, the data terminal device 3 transmits to the position notifying device 1 an e-mail having a request identifier being set in a predetermined box thereof. Rather than being limited to the above, the data terminal device 3 may generate data for requesting position information of an vehicle, and transmit to the position notifying device 1 an e-mail having the generated data attached thereto. In this case, the notification control section 18 interprets the attached data at step A2, and based on the result of interpretation, determines whether the data terminal device 3 is requesting position information or not.

In the above embodiment, the data terminal device 3 requests position information via an e-mail, and the position notifying device 1 determines whether or not to provide position information to the target data terminal device 3 by using the identification information DB 111 in which e-mail addresses are described. Rather than being limited to the above, data terminal device 3 requests position information by using either an e-mail or the IP. In this case, after determining by which method the data terminal device 3 has requested position information, the position notifying device 1 determines whether or not to provide position information to the target data terminal device 3, by using an identification information DB 111 in which e-mail addresses and MAC addresses (or IP addresses) are described. In the case of providing position information, the position notifying device 1 provides its position information to the data terminal device 3 by using an e-mail or the IP.

In general, onboard equipment is driven by a voltage which is supplied from a battery in the vehicle. Alternatively, by mounting a dedicated secondary battery to the position notifying device 1, it becomes possible for the data terminal device 3 to receive the position information of the vehicle even while an ignition switch of the vehicle is off.

The above embodiment illustrates a case where the position notifying device 1 is incorporated in a navigation system for vehicles. Rather than being limited to the above, the position notifying device 1 may alternatively be incorporated in a navigation system for pedestrians.

(First Variant)

Figure 6:
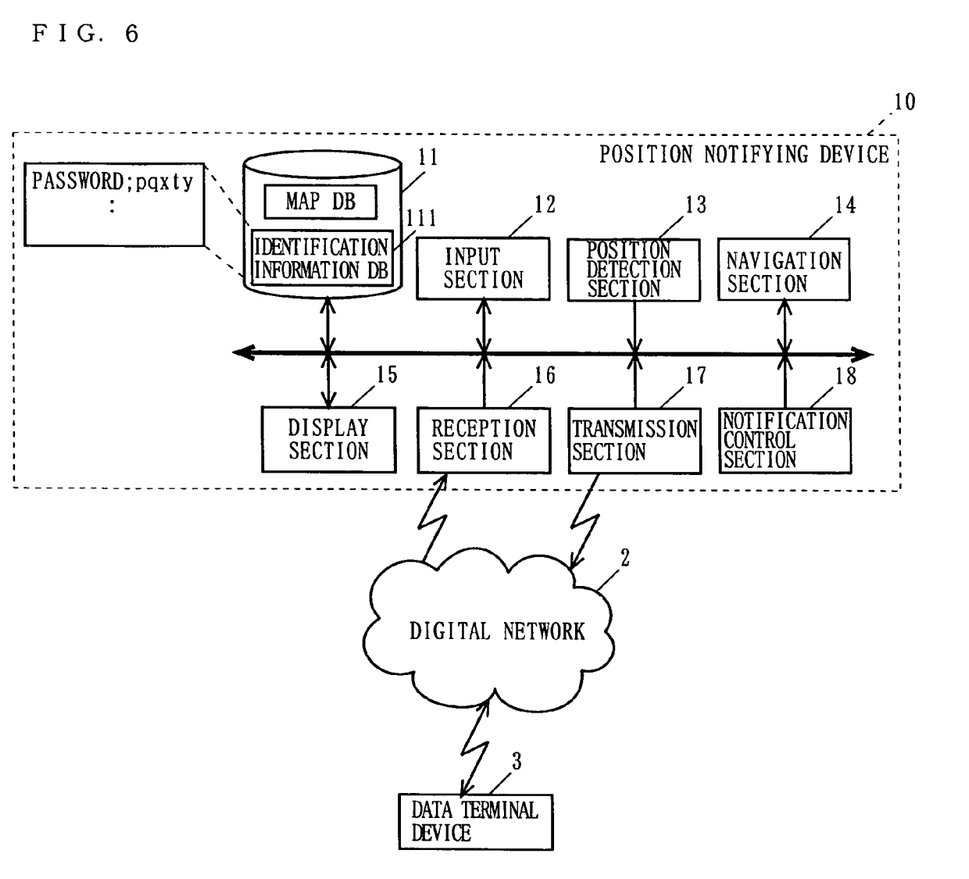
FIG. 6 is a block diagram illustrating an overall structure of a position notifying device 10 according to a first variant of the present invention.

FIG. 6 is a block diagram illustrating an overall structure of a position notifying device 10 according to a first variant. In FIG. 6, the position notifying device 10 differs from the above-described position notifying device 1 in that the identification information DB 111 contains at least one password instead of an e-mail address. Otherwise, there is no structural difference between the position notifying devices 1 and 10. Therefore, in FIG. 6, any component elements corresponding to those shown in FIG. 1 are denoted by like reference numerals, and the descriptions thereof are omitted.

A password is a character sequence which the aforementioned provider can freely determine. Note that a password may be determined between the provider and a recipient to whom the provider is willing to notify his or her current position.

Next, the operation and the process of the position notifying device 10 will be described. First, the provider operates the input section 12 to input a fixed password. The input device 12 sends the input e-mail address to the notification control section 18. The notification control section 18 registers the received e-mail address to the identification information DB 111 in the storage section 11.

Hereinafter, with reference to the flowchart of FIG. 7, processes which are characteristic of the position notifying device 10 will be described.

While the provider is driving the vehicle, the navigation section 14 performs navigation as described above. In advance, a recipient is provided with a password which has been registered by the provider in the identification information DB 111. Under these conditions, if the recipient wants to know the current position of the provider, the recipient operates his or her own data terminal device 3 to create an e-mail (position request) as follows. The created e-mail is to contain the aforementioned request identifier and the aforementioned password, typically in a predetermined box such as a subject box or a main text box. Herein, the request identifier and the password have predetermined formats. Furthermore, in the addressee box of the e-mail, an e-mail address which is previously assigned to the position notifying device 10 is described. The created e-mail is sent out from the data terminal device 3 onto the digital network 2.

Figure 7:
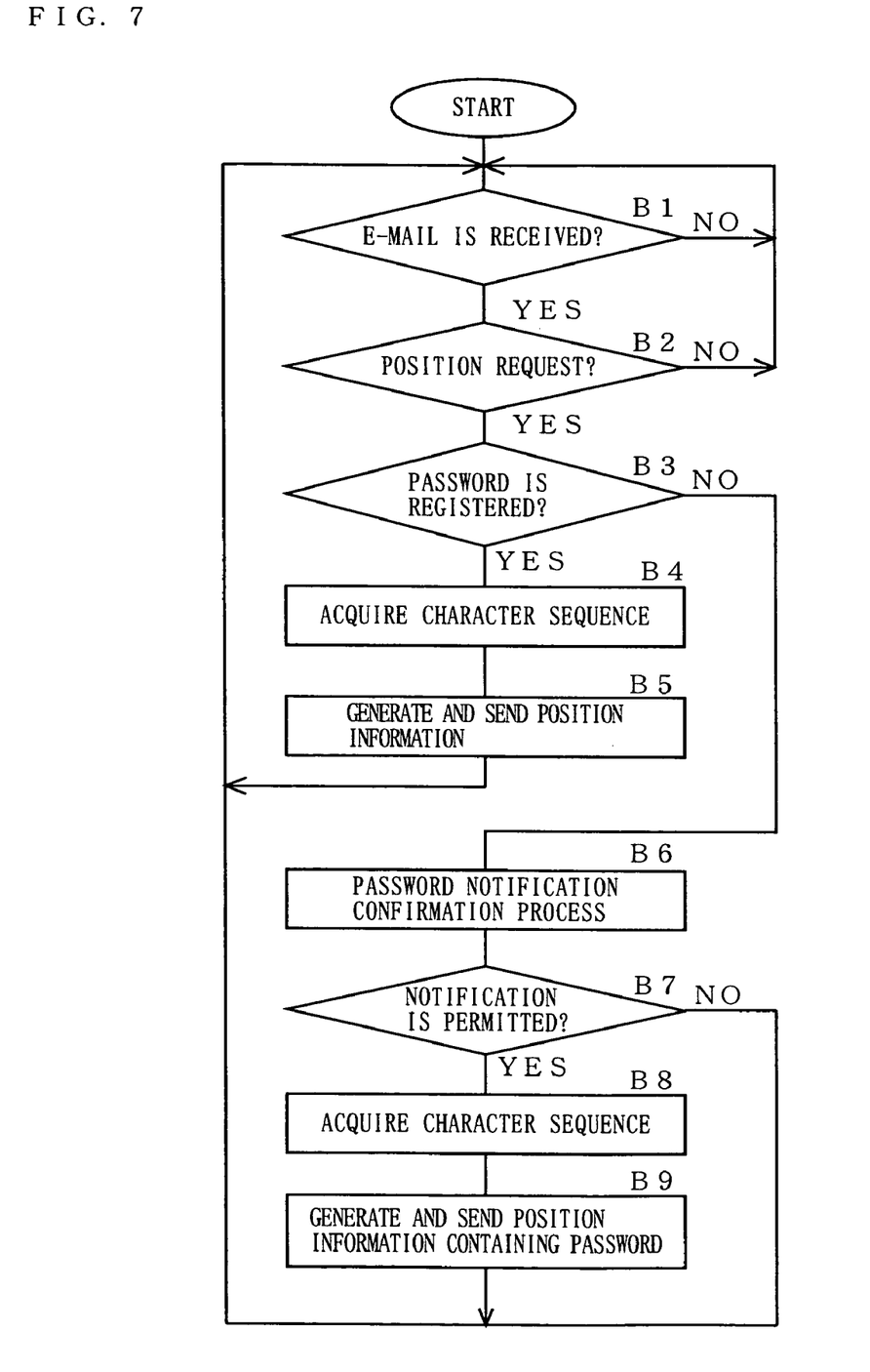
FIG. 7 is a flowchart illustrating an operation of the position notifying device 10 show in FIG. 6.

In the position notifying device 10, the reception section 16 receives the e-mail from the data terminal device 3 via the digital network 2 (step B1 in FIG. 7). The notification control section 18 extracts a character sequence from a predetermined box of the e-mail having been received by the reception section 16 in which a request identifier is set. Thereafter, the notification control section 18 determines whether the extracted character sequence is a request identifier or not. In other words, the notification control section 18 determines whether the present e-mail is a position request or not (step B2).

If it is determined "NO" at step B2, the notification control section 18 returns to step B1 to await reception of a new e-mail. On the other hand, if it is determined "YES", the notification control section 18 extracts a character sequence from the box of the present e-mail in which a password is set. Thereafter, the notification control section 18 determines whether a password which is the same as the currently extracted character sequence is registered in the identification information DB 111 of the storage section 11 or not (step B3).

If it is determined "YES" at step B3, the notification control section 18 receives the character sequence which has been extracted by the navigation section 14, in a manner similar to step A4 described above (step B4). As described in the above embodiment, at step B4, as position information, the notification control section 18 may receive from the navigation section 14 a neighborhood map image on which a mark indicating the current position of the vehicle is superposed.

Next, in order to reply to the e-mail which has currently been sent from the data terminal device 3, the notification control section 18 creates an e-mail containing position information in a manner similar to step A5 described above, and passes it to the transmission section 17. The transmission section 17 sends out the received e-mail onto the digital network 2 (step B5).

As described in the above embodiment, the data terminal device 3 displays position information of the provider by using the e-mail which has been sent from the position notifying device 3 (see FIG. 3).

Figure 8:
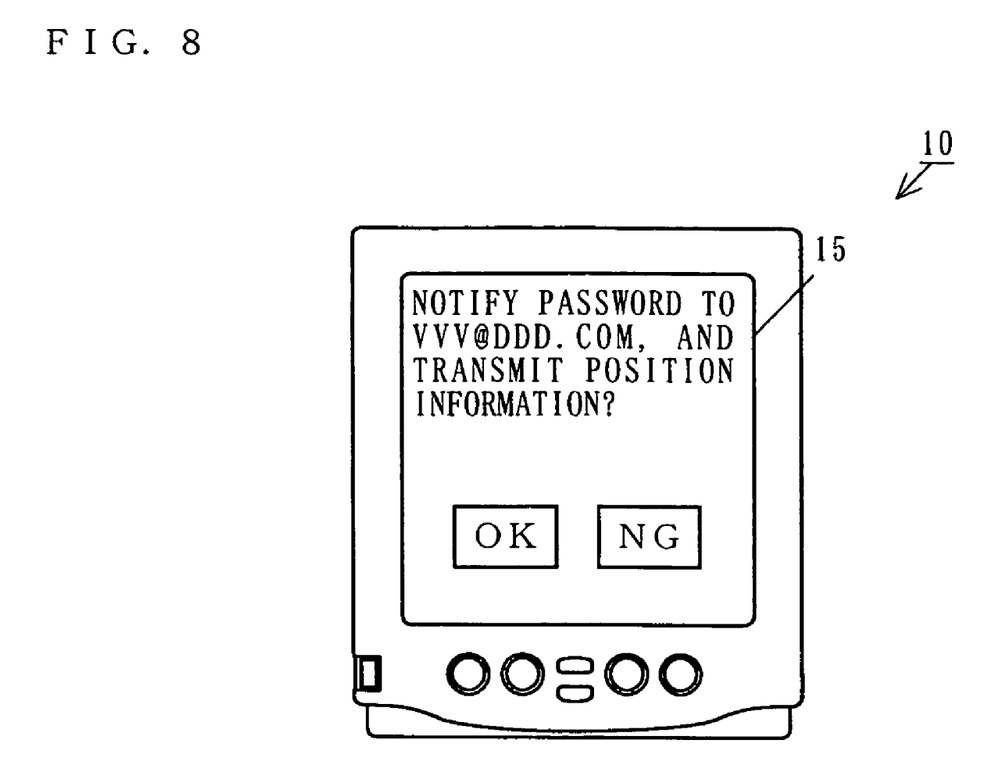
FIG. 8 is a schematic diagram illustrating an example of a notification confirmation image to be displayed on the display section 15 at step B6 in FIG. 7.

If it is determined "NO" at step B3, the notification control section 18 asks for confirmation of password notification to the sender of the present e-mail (step B6). Specifically, the notification control section 18 generates an image for inquiring as to whether the password which is registered in the identification information DB 111 may be notified to the sender of the present e-mail (hereinafter referred to as a "notification confirmation image"), and passes the image to the display section 15. The display section 15 displays the received notification confirmation image as shown in FIG. 8.

Looking at the displayed notification confirmation image, the provider operates the input section 12 to input an answer to the inquiry from the position notifying device 1. The input section 12 passes the input answer to the notification control section 18. If the received answer indicates that notification of the password is permitted (step B7), the notification control section 18 receives the character sequence which has been extracted by the navigation section 14 in a manner similar to step B4 (step B8).

Thereafter, the notification control section 18 creates an e-mail which contains the password that is registered in the identification information DB 111 and the position information of the provider, and whose addressee box has the e-mail address of the sender set therein, and sends out the created e-mail onto the digital network 2 via the transmission section 17 (step B9). As a result, the sender of the present e-mail also becomes capable of enjoying the provision of the position information. Thereafter, the notification control section 18 returns to step B1 to await reception of a new e-mail.

On the other hand, if step B7 finds that the received answer indicates non-permission of registration, steps B8 and B9 are not performed, and control returns to step B1 to await reception of a new e-mail. Alternatively, before returning to step B1, the notification control section 18 may create an e-mail that the position information cannot be provided based on the fact that the password is not authentic, and reply to the data terminal device 3 with this.

As described above, according to the position notifying device 10 according to the present variant, a recipient can know the current position of the provider when the recipient wants to know, as in the case of the above embodiment. Furthermore, the position notifying device 10 can ensure that position information is not provided to those who are considered undesirable by the provider.

Furthermore, according to the present variant, the position notifying device 10 registers a password, which is at least free for the provider to set, to the identification information DB 111. Therefore, by making the registered password known to a plurality of recipients, the position notifying device 10 can provide the position information of the provider to each recipient. In other words, if at least one password is registered, the position notifying device 10 can provide position information to a plurality of recipients. Therefore, as compared to the above embodiment where the e-mail address of each recipient must be registered in the identification information DB 111, the number of operations of the input section 12 to be made by the provider can be reduced. As a result, a position notifying device 10 which is easier for the provider to use can be provided.

(Second Variant)

Figure 9:
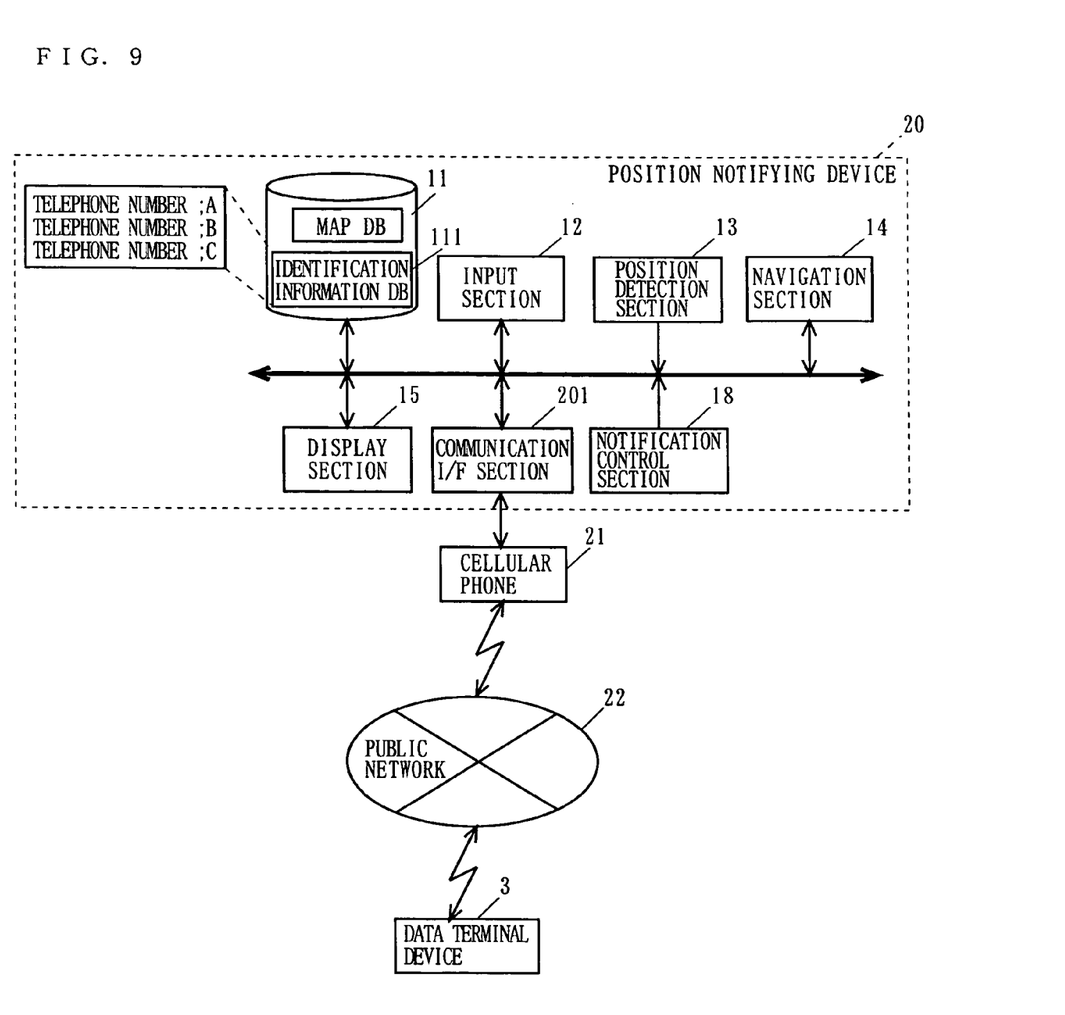
FIG. 9 is a block diagram illustrating an overall structure of a position notifying device 20 according to a second variant of the present invention.

FIG. 9 is a block diagram illustrating an overall structure of a position notifying device 20 according to a second variant. In FIG. 9, the position notifying device 20 differs from the above-described position notifying device 1 in that the identification information DB 111 contains a number of telephone numbers instead of e-mail addresses, and comprises a communication I/F section 201 instead of the reception section 16 and the transmission section 17. Otherwise, there is no structural difference between the position notifying devices 1 and 20. Therefore, in FIG. 9, any component elements corresponding to those shown in FIG. 1 are denoted by like reference numerals, and the descriptions thereof are omitted.

The identification information DB 111 is a collection of identification information which uniquely identifies cellular phones or stationary phones as data terminal devices 3 (see FIG. 1) which are permitted to receive position information from the present position notifying device 20. In the present embodiment, the identification information is exemplified as a telephone number which is assigned to a cellular phone or a stationary phone.

The communication I/F section 201 is typically constructed so as to be capable of performing data communications with a cellular phone 21 which is brought into an vehicle. The cellular phone 21 performs data communications with an external data terminal device 3 via a public network 22. Furthermore, the communication I/F section 201 receives a control signal and a tone signal for voice calls via the cellular phone 21, and sends the control signal and tone signal to the notification control section 18. Typical examples of control signals are that which indicates an incoming call from the external data terminal device 3 to the cellular phone 21 in the vehicle, and a telephone number which is assigned to the external data terminal device 3. A tone signal is a signal which is sent out from the data terminal device 3 when a dialing button on the data terminal device 3 is pressed by a recipient. The communication I/F section 201 further sends out various synthesized voices which are generated in the notification control section 18 to the cellular phone 21 in the vehicle.

Next, the operation and the process of the position notifying device 20 will be described. First, the provider operates the input section 12 to input a telephone number which is assigned to a data terminal device 3 possessed by a person who is entitled to notification of the current position of the vehicle. The input device 12 sends the input telephone number to the notification control section 18. The notification control section 18 registers the received telephone number to the identification information DB 111 in the storage section 11.

Hereinafter, with reference to the flowchart of FIG. 10, processes which are characteristic of the position notifying device 20 will be described.

While the provider is driving the vehicle, the navigation section 14 performs navigation as described above. If the recipient wants to know the current position of the provider, the data terminal device 3 places a call to the cellular phone of the provider. As a result, the cellular phone 21 in the vehicle at least receives, via the public network 22, a control signal indicative of an incoming call and a control signal indicative of the telephone number of the data terminal device 3. The cellular phone 21 sends the respective received control signals to the communication I/F section 201 of the position notifying device 20.

In the position notifying device 20, the communication I/F section 201 sends the respective received control signals to the notification control section 18. Upon recognizing from the control signal that an incoming call has been made (step C1 in FIG. 10), the notification control section 18 generates a first synthesized voice, and sends the first synthesized voice to the communication I/F section 201. The communication I/F section 201 transmits the received first synthesized voice to the cellular phone 21 (step C2). Herein, the first synthesized voice represents a message that a press of a first dialing button is required in order to request position information of the provider, and that otherwise a press of a second dialing button is required.

The first synthesized voice which has been sent out from the position notifying device 20 is transmitted to the data terminal device 3 via the cellular phone 21 and the public network 22. In accordance with the first synthesized voice which is output from the data terminal device 3, the recipient operates either the first or second dialing button. In response to the recipient's operation, the data terminal device 3 generates a first or second tone signal indicating that the first or second dialing button has been operated, and transmits the first or second tone signal to the position notifying device 20 via the public network 22 and the cellular phone 21.

In the position notifying device 20, the communication I/F section 201 receives the first or second tone signal from the cellular phone 21 (step C3), and sends the received one to the notification control section 18. The notification control section 18 determines whether what has currently been sent thereto is the first tone signal or not (step C4).

Figure 10:
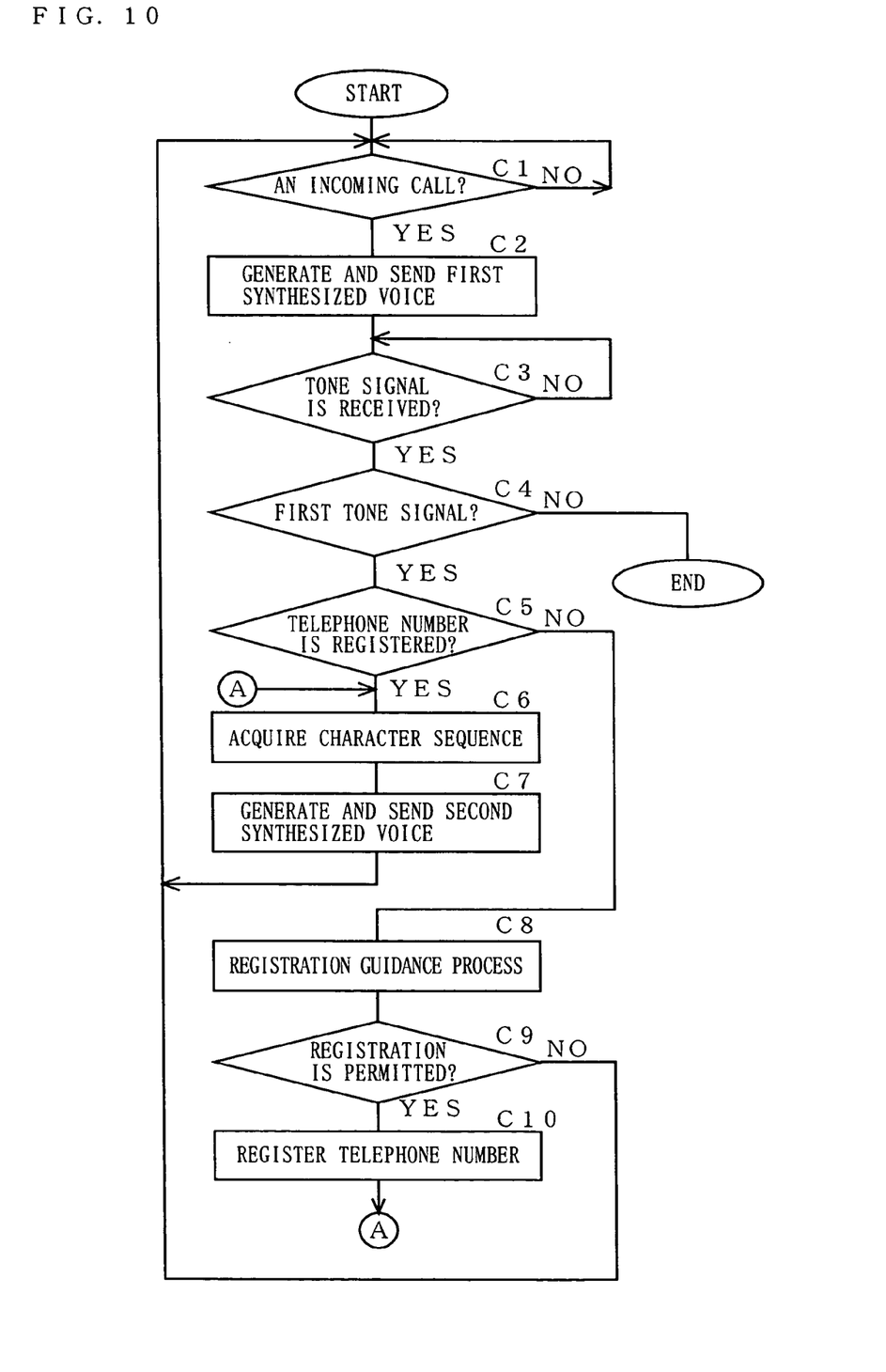
FIG. 10 is a flowchart illustrating an operation of the position notifying device 20 shown in FIG. 9.

If it is determined "NO" at step C4, the current incoming call is regarded not as a request for position information of the provider, but as an incoming call for a usual voice call, and the notification control section 18 ends the process of FIG. 10. On the other hand, if it is determined "YES", the current first tone signal is regarded as a position request, and the notification control section 18 determines whether the same telephone number that is contained in the aforementioned control signal is registered in the identification information DB 111 of the storage section 11 or not (step C5).

If it is determined "YES" at step C5, the notification control section 18 receives the character sequence which has been extracted by the navigation section 14, in a manner similar to step A4 (step C6). Next, from the received character sequence, the notification control section 18 generates a second synthesized voice indicating the current position of the provider, and transmits the second synthesized voice to the cellular phone 21 via the communication I/F section 201 (step C7). An example of the second synthesized voice may be "the vehicle is currently traveling along Route N in XX city, near CC intersection".

The second synthesized voice is received by the data terminal device 3, in a manner similar to the first synthesized voice. The data terminal device 3 outputs the received second synthesized voice, with which the recipient can know the current position of the provider.

If it is determined "NO" at step C5, the notification control section 18 assumes that the current caller is not presently permitted to receive notification of the current position of the provider, and performs a registration guidance process similar to the aforementioned step A6 (step C8). Step C8 differs from the aforementioned step A6 only in that the target of registration is not an e-mail address but a telephone number. Therefore, any detailed description of step C8 is omitted.

If the answer which is received after step C8 indicates permission of registration of the telephone number (step C9), the notification control section 18 registers the target telephone number to the identification information DB 111 (step C10), and thereafter performs step C6. On the other hand, if the received answer indicates non-permission of registration (step C11), step C10 is not performed, and control returns to step C1 to await reception of a new incoming call. Alternatively, before returning to step C1, the notification control section 18 may create a third synthesized voice to the effect that the position information cannot be provided, e.g., "position information cannot be provided because your telephone number is not registered", and transmit the third synthesized voice to the data terminal device 3.

As described above, in accordance with position notifying device 20 of the present variant, a recipient can know the current position of the provider when the recipient wants to know, as in the above embodiment. Since the position information of the provider is only provided to permitted data terminal devices 3, the position notifying device 20 can ensure that position information is not provided to those who are considered undesirable by the provider.

In the above variant, the data terminal device 3 and the position notifying device 20 transmit a position request and position information via the public network 22. Rather than being limited to the above, the data terminal device 3 requests position information by using either a tone signal or an e-mail. In this case, after determining by which method the data terminal device 3 has requested position information, the position notifying device 20 further determines whether or not to provide position information to the target data terminal device 3, by using an identification information DB 111 in which telephone numbers and e-mail addresses are described. In the case of providing position information, the position notifying device 20 may provide its own position information to the data terminal device 3 by using either a second synthesized voice or en e-mail. Moreover, the position notifying device 20 and the data terminal device 3 may transmit a position request and position information by using the IP, other than a tone signal and an e-mail.

In the present variant, the position notifying device 20 determines whether or not to provide position information to the data terminal device 3 by using a telephone number. Rather than being limited to the above, the position notifying device 20 may determine whether or not to provide position information to the data terminal device 3 by using a password which has been described in the first variant. In this case, the position notifying device 20 transmits to the data terminal device 3 a synthesized voice which requests a password.

(Third Variant)

Next, a position notifying device 30 as a third variant of the position notifying device 1 will be described. The position notifying device 30 has operational differences from the above-described position notifying device 1 but has no structural differences therefrom. Therefore, FIG. 1 will be relied on in the following description, and any component elements in the position notifying device 30 that correspond to those in the position notifying device 1 are denoted by like reference numerals, and the descriptions thereof are omitted.

Figure 11:
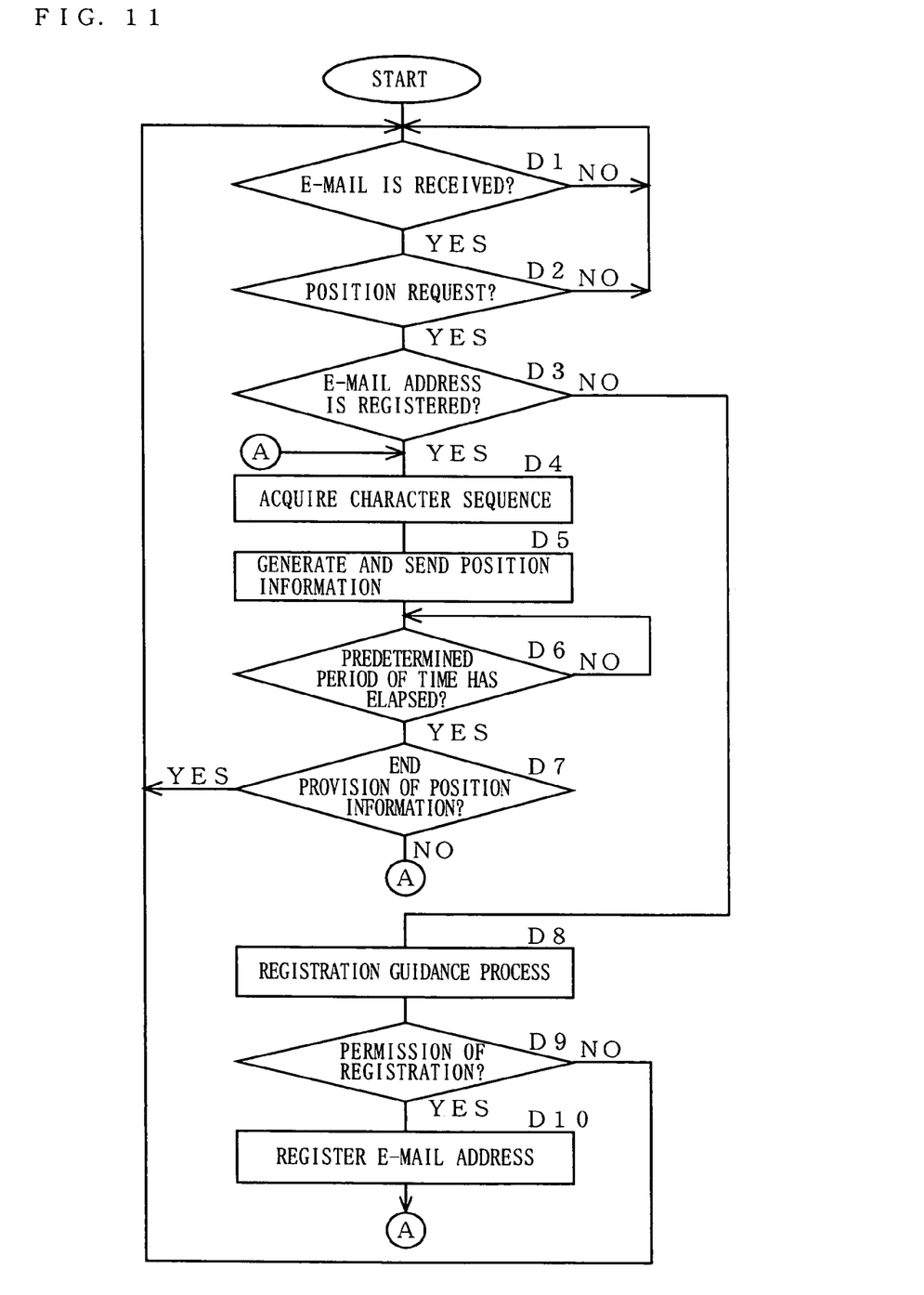
FIG. 11 is a flowchart illustrating an operation of a position notifying device 30 according to a third variant of the present invention.

Hereinafter, with reference to the flowchart of FIG. 11, the operation and the process of the position notifying device 30 will be described. As described above, while the provider is driving an vehicle, the navigation section 14 performs navigation. When the recipient wants to know the current position of the provider, the recipient creates an e-mail as a position request which has been described in the above embodiment. The e-mail created by the data terminal device 3 is transmitted to the position notifying device 30 via the digital network 2.

In the position notifying device 1, in a manner similar to step A1 described above, the reception section 16 receives the e-mail from the data terminal device 3 (step D1 in FIG. 11), and thereafter sends the received e-mail to the notification control section 18. In a manner similar to step A2 described above, the notification control section 18 determines whether the present e-mail is a position request or not (step D2).

If it is determined "NO" at step D2, the notification control section 18 returns to step D1. On the other hand, if it is determined "YES", in a manner similar to step A3, the notification control section 18 determines whether an e-mail address which is the same as that of the sender is registered in the identification information DB 111 of the storage section 11 or not (step D3).

If it is determined "YES" at step D3, the notification control section 18 receives the character sequence which has been extracted by the navigation section 14 in a manner similar to step A4 described above (step D4).

Next, in a manner similar to step A5 described above, the notification control section 18 creates an e-mail as position information, and passes the e-mail to the transmission section 17. The transmission section 17 sends out the received e-mail onto the digital network 2 (step D5).

Next, after performing step D5, the notification control section 18 determines whether a predetermined period of time has elapsed or not (step D6). As will be clarified later, in the present variant, the position information is to be repeatedly provided, approximately with the aforementioned time interval. If the time in step D6 is too short, the data communication cost for the position notifying device 30 and the data terminal device 3 increases; if it is too long, it becomes difficult for the data terminal device 3 to grasp the current position of the provider. Therefore, typically in consideration of the traveling speed of the vehicle, the time period of step D6 is set to be an appropriate value such as 10 minutes.

If it is determined "YES" at step D6, the notification control section 18 determines whether or not to end provision of position information or not (step D7). There may be several criteria for determining whether or not to end provision of position information: firstly, it may be whether an e-mail indicating that provision of position information is to be ended has arrived from the data terminal device 3 or not. Secondly, the navigation section 14 may be providing guidance to the destination point of the vehicle along an optimum route which has been obtained by a well-known route search. In such a case, the determination of step D7 may be made based on whether the vehicle has arrived at the destination point or not.

If it is determined "YES" at step D7, the notification control section 18 returns to step D1 to await reception of a new e-mail. On the other hand, if it is determined "NO", the notification control section 18 returns to step D4 and create new position information.

Via the digital network 2, the data terminal device 3 receives each e-mail from the position notifying device 30 at a time interval. After receiving each e-mail, the data terminal device 3 displays the position information which is contained in the e-mail (see FIG. 3). As a result, the recipient can continuously know the current position of the provider.

If it is determined "NO" at step D3, the notification control section 18 performs processes similar to steps A6, A7, and A8 described above (steps D8, D9, and D10).

As described above, in accordance with the position notifying device 30 of the present variant, position information is provided to the data terminal device 3 every predetermined period of time, so that the recipient can know the movement of the provider more easily. Once transmitting a single position request at the beginning, the data terminal device 3 can thereafter continuously receive position information from the position notifying device 30, so that a position notifying device 30 which is easy for the recipient to use can be provided.

In the above variant, the position notifying device 30 determines whether a predetermined period of time has elapsed or not at step D6. Rather than being limited thereto, after performing step D5, the position notifying device 30 may alternatively determine at step D6 whether the vehicle has traveled a predetermined distance or not. The traveled distance of the vehicle can be easily obtained by accumulating the detection results of an vehicle velocity sensor which is installed in the vehicle. If the vehicle has traveled the predetermined distance, the notification control section 18 performs step D4. Otherwise, at step D6, the position notifying device 30 may determine whether the vehicle has made a right or left turn at an intersection, and perform step D4 when a right or left turn has been made.

Figure 12:
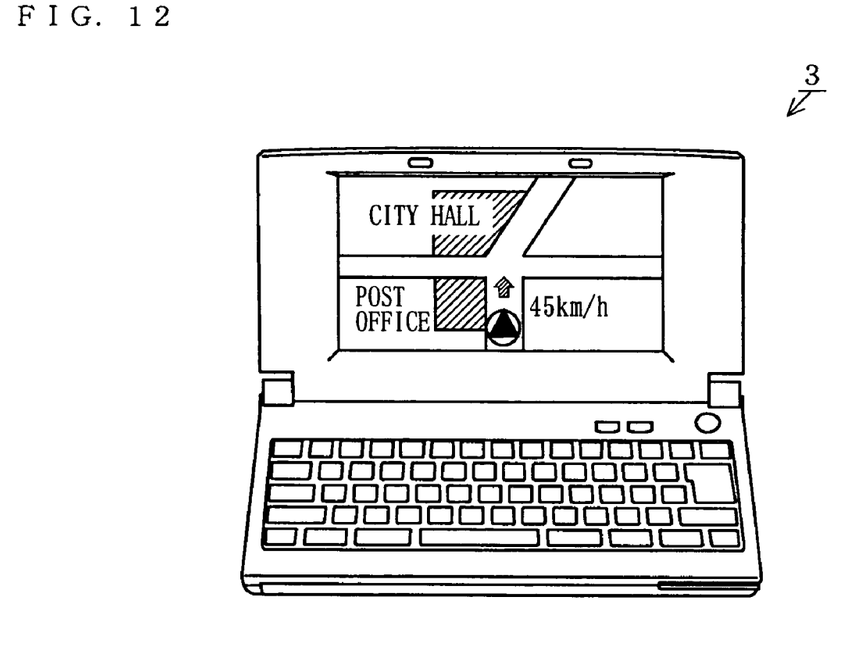
FIG. 12 is a schematic diagram illustrating an example of a neighborhood map image to be generated at step D4 in FIG. 11.
Figure 13:
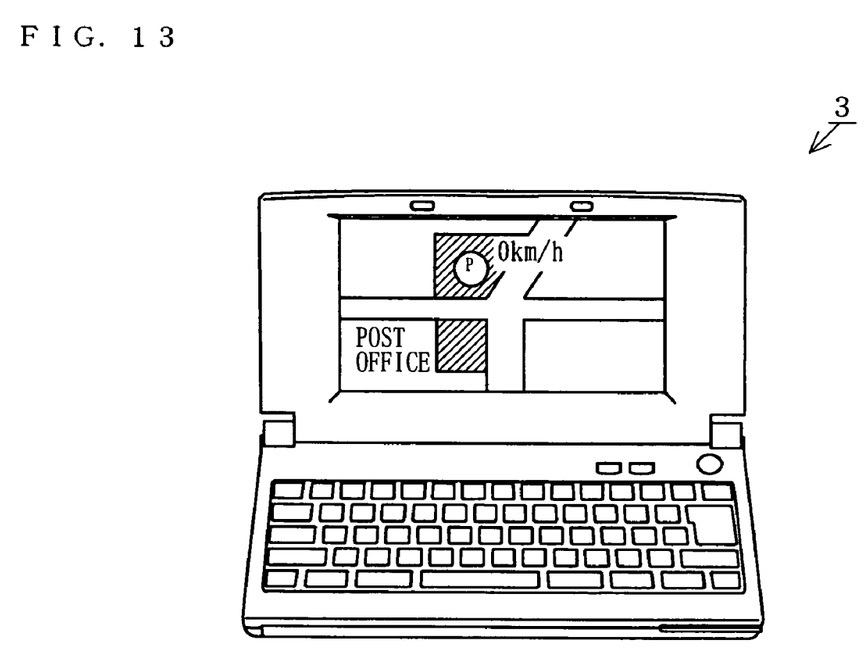
FIG. 13 is a schematic diagram illustrating another example of a neighborhood map to be generated at step D4 in FIG. 11.

Moreover, as described in the above embodiment, the notification control section 18 may receive from the navigation section 14 an e-mail having attached thereto a neighborhood map image on which a mark indicating the current position of the vehicle is superposed as position information. As shown in FIG. 12, it is further preferable that the neighborhood map image has information of the traveling direction and the traveling speed of the vehicle being superposed thereto. It is further preferable that, if the vehicle is stopped, information indicating that the vehicle is being stopped is superposed on the neighborhood map image, as shown in FIG. 13. In the case where the vehicle is being guided toward and destination point along a route which has been found by the navigation section 14, it is preferable that the route of the vehicle is superposed on the neighborhood map image.

The repetitious transmission of position information as described in the above variant can be easily applied to the position notification devices 10 and 20 according to the first and second variants.

While the invention has been described in detail, the foregoing description is in all aspects illustrative and not restrictive. It is understood that numerous other modifications and variations can be devised without departing from the scope of the invention.

INDUSTRIAL APPLICABILITY

The present invention is applicable to an apparatus, such as a navigation system for vehicles, which is capable of deriving the position of a moving object.

The invention claimed is:

1. A position notifying device, mounted on a moving object, for transmitting position information of the moving object to a remote data terminal device, comprising:
 a storage section for storing identification information for identifying the data terminal device;
 a reception section for receiving, from the data terminal device, a position request for requesting position information of a moving object and identification information;
 an identification information determination section for, in response to the position request received by the reception section, determining whether the identification information received by the reception section has been stored in the storage section or not;
 a position information generation section for, after the identification information determination section determines that the identification information has been stored in the storage section, generating position information of the moving object;
 a transmission section for transmitting each piece of position information generated by the position information generation section to the data terminal device; and
 an end determination section for, after the transmission section has transmitted each piece of position information, determining whether or not to end provision of position information to the data terminal device, wherein,
 the position information generation section newly generates position information of the moving object, at a time interval, until the end determination section determines that provision of position information is to be ended.

2. The position notifying device according to claim 1, wherein the identification information is previously uniquely assigned for the data terminal device to perform communications.

3. The position notifying device according to claim 1, wherein the identification information is at least for a user of the position notifying device to freely determine.

4. The position notifying device according to claim 1, wherein, together with the position information, the position information generation section transmits one of traveling speed information of the moving object, traveling direction information of the moving object, and a traveling route of the moving object.

5. A position notifying method for transmitting position information of a moving object to a remote data terminal device, comprising:

a storage step of storing identification information for identifying the data terminal device;

a reception step of receiving, from the data terminal device, a position request for requesting position information of a moving object and identification information;

an identification information determination step of, in response to the position request received in the reception step, determining whether the identification information received in the reception step has been stored in the storage step or not;

a position information generation step of, after the identification information determination step determines that the identification information has been stored in the storage step, generating position information of the moving object;

a transmission step of transmitting the position information generated by the position information generation step to the data terminal device; and an end determination step of, after the position information has been transmitted in the transmission step, determining whether or not to end provision of position information to the data terminal device, wherein, in the position information generation step, position information of the moving object is newly generated at a time interval until the end determination step determines that provision of position information is to be ended.

* * * * *